United States Patent
Kimoto et al.

(10) Patent No.: US 10,252,870 B2
(45) Date of Patent: Apr. 9, 2019

(54) STACKING-PATTERN CALCULATING DEVICE AND STACKING SYSTEM

(71) Applicant: FANUC CORPORATION, Yamanashi (JP)

(72) Inventors: Yuuki Kimoto, Yamanashi (JP); Yoshiharu Nagatsuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/689,010

(22) Filed: Aug. 29, 2017

(65) Prior Publication Data

US 2018/0086572 A1 Mar. 29, 2018

(30) Foreign Application Priority Data

Sep. 29, 2016 (JP) ................................. 2016-191116

(51) Int. Cl.
*B65G 57/22* (2006.01)
*B65G 57/03* (2006.01)
(Continued)

(52) U.S. Cl.
CPC ............. *B65G 57/22* (2013.01); *B65G 57/03* (2013.01); *G05B 19/4182* (2013.01); *G06Q 10/08* (2013.01); *B65G 57/00* (2013.01); *B65G 61/00* (2013.01); *B65G 2203/0208* (2013.01); *B65G 2203/041* (2013.01)

(58) Field of Classification Search
CPC ....................................................... B65G 57/22
See application file for complete search history.

(56) References Cited

U.S. PATENT DOCUMENTS 4,692,876 A * 9/1987 Tenma ................. B65G 1/1371
 414/791.6
5,501,571 A * 3/1996 Van Durrett ........... B65G 61/00
 414/21
(Continued)

FOREIGN PATENT DOCUMENTS

EP 3104313 A1 12/2016
JP H05-4725 A 1/1993
(Continued)

OTHER PUBLICATIONS

Office Action dated Jul. 3, 2018 in corresponding Japanese Application No. 2016-191116; 6 pages.
(Continued)

*Primary Examiner* — Thomas Randazzo
(74) *Attorney, Agent, or Firm* — Maier & Maier, PLLC

(57) ABSTRACT

A stacking-pattern calculating device including a storage portion that stores dimensions, weights, load limits, and numbers of the respective types of boxes and dimensions of the accommodating region; a smallest-combination calculating portion that calculates a combination of the boxes that forms a smallest unit, that have a constant height, and in which a bottom area becomes the smallest; a layer-combination calculating portion that calculates a combination that forms a layer in which the smallest units having the same height among the combinations of the smallest units are placed next to each other in a horizontal direction so as to have a rectangular shape in a plan view.

6 Claims, 10 Drawing Sheets

(51) Int. Cl.
*G05B 19/418* (2006.01)
*G06Q 10/08* (2012.01)
*B65G 57/00* (2006.01)
*B65G 61/00* (2006.01)

(56) References Cited

U.S. PATENT DOCUMENTS

| | | | | |
|---|---|---|---|---|
| 6,055,462 | A * | 4/2000 | Sato | B25J 9/1687 |
| | | | | 700/217 |
| 6,401,007 | B1 * | 6/2002 | Yablonovitch | B65G 47/917 |
| | | | | 700/213 |
| 7,221,998 | B2 * | 5/2007 | Brust | B07C 5/10 |
| | | | | 209/566 |
| 8,406,917 | B2 * | 3/2013 | Khan | B25J 9/1687 |
| | | | | 700/217 |
| 8,965,559 | B2 * | 2/2015 | Pankratov | G06Q 10/043 |
| | | | | 700/213 |
| 9,315,344 | B1 * | 4/2016 | Lehmann | G06Q 10/08 |
| 2009/0069939 | A1 * | 3/2009 | Nagatsuka | B25J 9/1671 |
| | | | | 700/258 |
| 2010/0222915 | A1 * | 9/2010 | Kuehnemann | B65G 57/00 |
| | | | | 700/217 |
| 2012/0070263 | A1 | 3/2012 | Van Schijndel et al. | |
| 2013/0282165 | A1 | 10/2013 | Pankratov et al. | |
| 2015/0073588 | A1 * | 3/2015 | Priebe | B65G 57/26 |
| | | | | 700/217 |
| 2015/0166272 | A1 | 6/2015 | Pankratov et al. | |
| 2017/0146341 | A1 | 5/2017 | Kimoto et al. | |

FOREIGN PATENT DOCUMENTS

| | | |
|---|---|---|
| JP | H07-291451 A | 11/1995 |
| JP | 2002-029631 A | 1/2002 |
| JP | 2013-71785 A | 4/2013 |
| JP | 2014-530158 A | 11/2014 |
| JP | 2015-037992 A | 2/2015 |
| JP | 2017-094428 A | 6/2017 |
| WO | 2013/059366 A2 | 4/2013 |

OTHER PUBLICATIONS

Search Report dated Jun. 14, 2018 in corresponding Japanese Application No. 2016-191116; 18 pages.

* cited by examiner

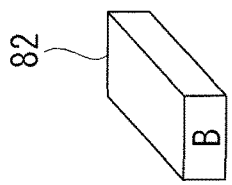
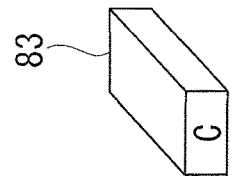
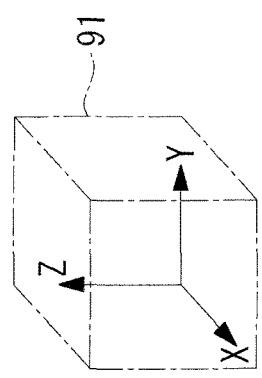
FIG. 3A
BOX A
WIDTH: 50 cm
LENGTH: 90 cm
HEIGHT: 50 cm
NUMBER OF BOX: 2
WEIGHT: 20 kg
LOAD LIMIT: 100 kg/m²
FIG. 3B
BOX B
WIDTH: 50 cm
LENGTH: 90 cm
HEIGHT: 25 cm
NUMBER OF BOX: 2
WEIGHT: 10 kg
LOAD LIMIT: 30 kg/m²
FIG. 3C
BOX C
WIDTH: 50 cm
LENGTH: 90 cm
HEIGHT: 25 cm
NUMBER OF BOX: 2
WEIGHT: 20 kg
LOAD LIMIT: 100 kg/m²
FIG. 3D
ACCOMMODATING REGION
WIDTH: 100 cm
LENGTH: 90 cm
HEIGHT: 100 cm

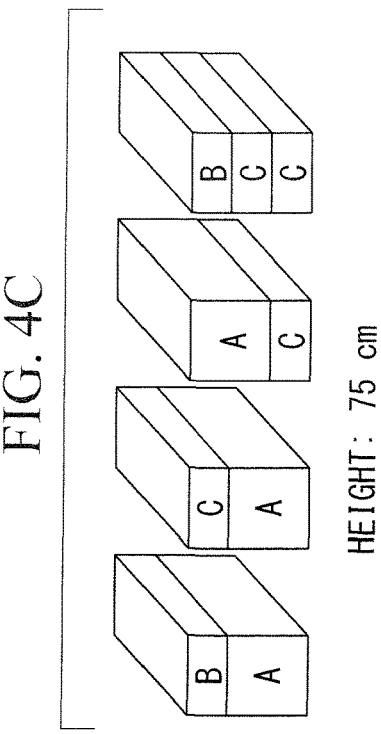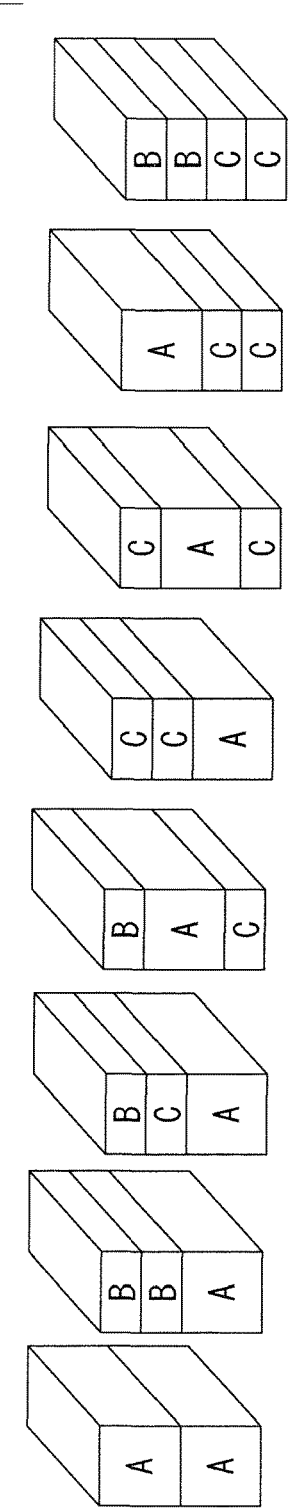

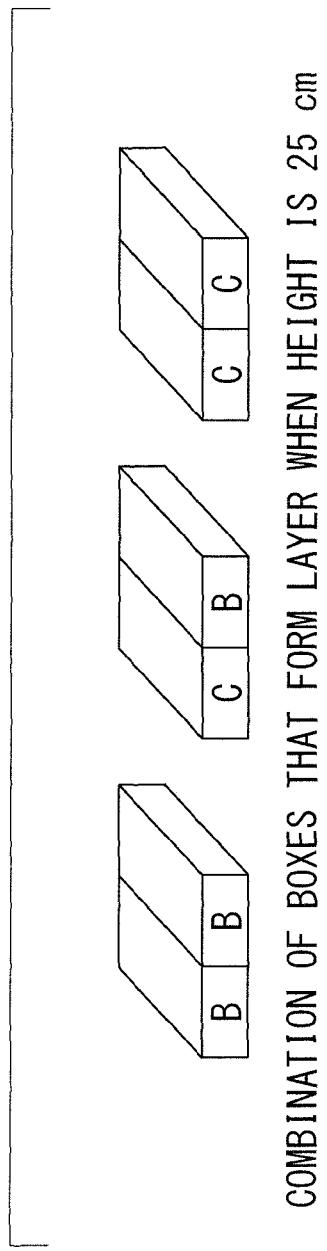

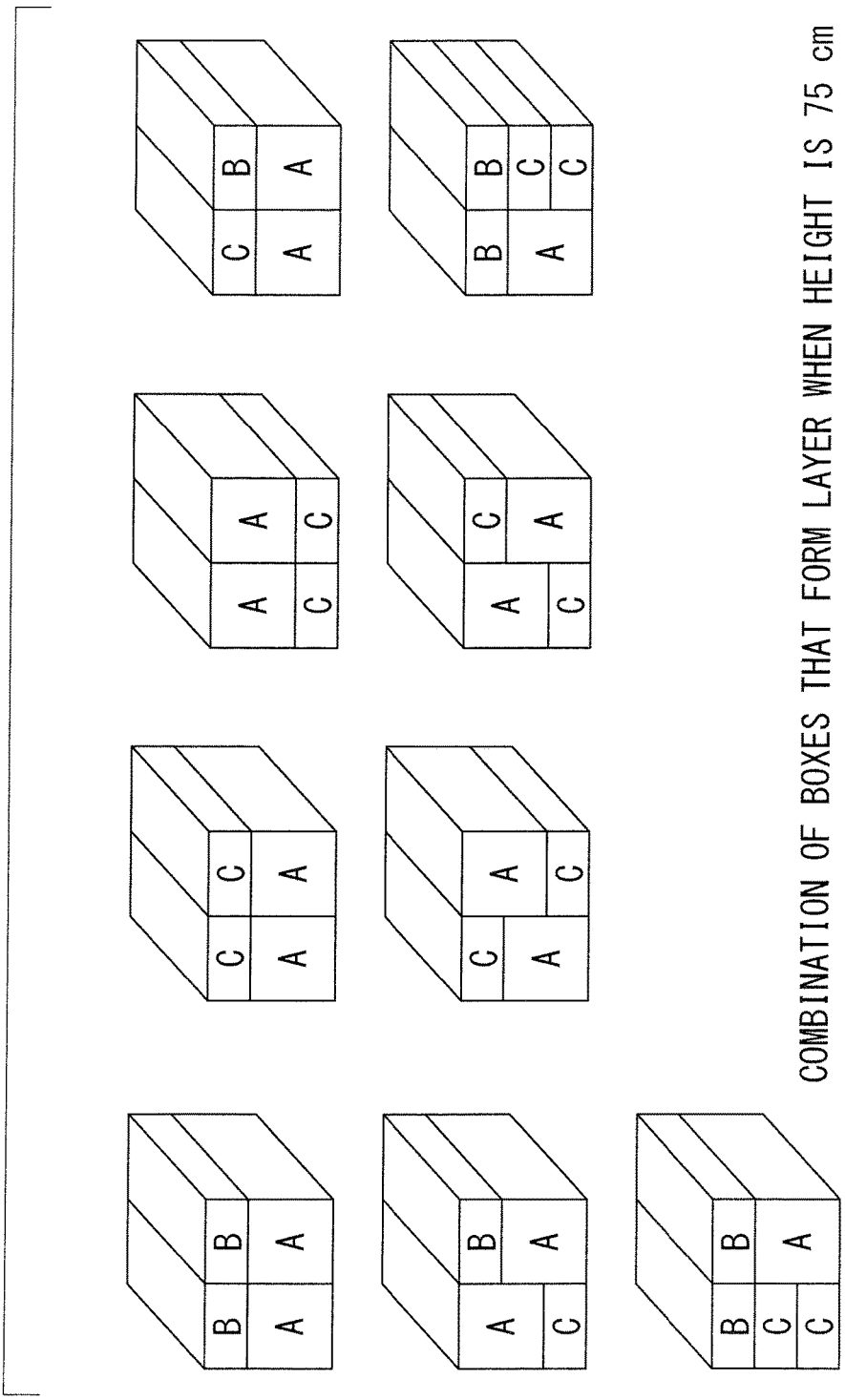
FIG. 5B COMBINATION OF BOXES THAT FORM LAYER WHEN HEIGHT IS 75 cm

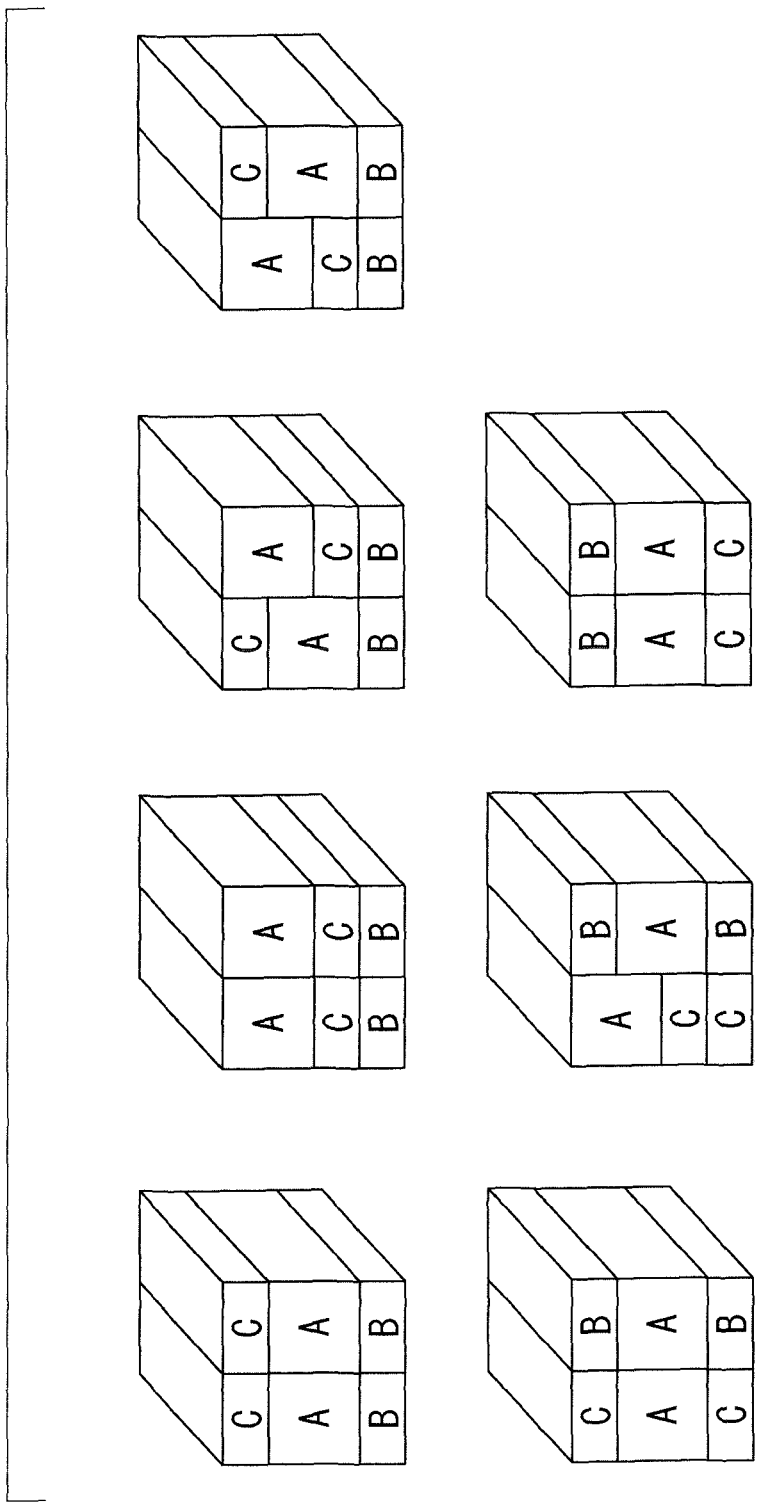

STACKING-PATTERN CALCULATING DEVICE AND STACKING SYSTEM

CROSS-REFERENCE TO RELATED APPLICATIONS

This application is based on Japanese Patent Application No. 2016-191116, the content of which is incorporated herein by reference.

TECHNICAL FIELD

The present invention relates to a stacking-pattern calculating device and a stacking system.

BACKGROUND ART

A system that stacks articles, which are transferred one by one by means of a transferring device such as a conveyor or the like, onto a palette by means of a robot is known as a palletizing system.

Patent Literature 1 discloses a method for, when multiple types of boxes having different dimensions are mixed in such a palletizing system, creating a combination for stacking the boxes on a palette, that is, a stacking pattern, on the basis of the dimensions of the boxes.

CITATION LIST

Patent Literature

{PTL 1} Japanese Unexamined Patent Application, Publication No. 2013-71785

SUMMARY OF INVENTION

A first aspect of the present invention is a stacking-pattern calculating device that calculates a stacking pattern when accommodating multiple types of boxes in an accommodating region, the stacking-pattern calculating device comprising: a storage portion that stores dimensions, weights, load limits, and numbers of the respective types of the boxes and dimensions of the accommodating region; a smallest-combination calculating portion that calculates, on the basis of the dimensions, the weights, the load limits, and the numbers of the respective types of the boxes and the dimensions of the accommodating region, combinations of the boxes that form smallest units that are formed of one or more boxes, that have a constant height, and in which a bottom area becomes the smallest; a layer-combination calculating portion that calculates, on the basis of the weights and the numbers of the respective types of the boxes and the dimensions of the accommodating region, combinations of the boxes that form layers in which the smallest units having the same height among the combinations of the smallest units are placed next to each other in a horizontal direction so as to have a rectangular shape in a plan view; a stacking-pattern-candidate calculating portion that calculates, on the basis of the numbers of the respective types of the boxes and the dimensions of the accommodating region, a stacking-pattern candidate by placing the layers on top of each other in a vertical direction in the combination of the layers; and a stacking-pattern-candidate correcting portion that corrects the stacking-pattern candidate on the basis of the weights and the load limits of the respective types of the boxes.

A second aspect of the present invention is a stacking system comprising a control device that is provided with a stacking-pattern calculating device described above, and that calculates, on the basis of the calculated stacking pattern, positions of the boxes inside the accommodating region; a transferring device that transfers the multiple types of boxes; a robot that places the transferred boxes inside the accommodating region; and a detecting device that detects the types of the boxes.

BRIEF DESCRIPTION OF DRAWINGS

FIG. 3A is a diagram showing one type of box used in the embodiment of the present invention.

FIG. 3B is a diagram showing another type of box used in the embodiment of the present invention.

FIG. 3C is a diagram showing another type of box used in the embodiment of the present invention.

FIG. 3D is a diagram showing an accommodating region in the embodiment of the present invention.

FIG. 4A is a perspective view for explaining smallest units constituted by combining the boxes shown in FIGS. 3A to 3C, and is a diagram showing the smallest units that have a height of 25 cm.

FIG. 4B is a perspective view for explaining smallest units constituted by combining the boxes shown in FIGS. 3A to 3C, and is a diagram showing the smallest units that have a height of 50 cm.

FIG. 4C is a perspective view for explaining smallest units constituted by combining the boxes shown in FIGS. 3A to 3C, and is a diagram showing the smallest units that have a height of 75 cm.

FIG. 4D is a perspective view for explaining smallest units constituted by combining the boxes shown in FIGS. 3A to 3C, and is a diagram showing the smallest units that have a height of 100 cm.

FIG. 5A is a diagram for explaining examples of layers constituted of the combinations of the smallest units shown in FIGS. 4A to 4D, showing the layers having a height of 25 cm.

FIG. 5B is a diagram for explaining examples of layers constituted of the combinations of the smallest units shown in FIGS. 4A to 4D, showing the layers having a height of 75 cm.

FIG. 6 is a diagram for explaining examples of stacking-pattern candidates constituted of combinations of the layers shown in FIGS. 5A and 5B, and is a diagram showing examples of the stacking-pattern candidates in the case in which a layer having a height of 75 cm is disposed on a layer having a height of 25 cm.

DESCRIPTION OF EMBODIMENT

Figure 1:
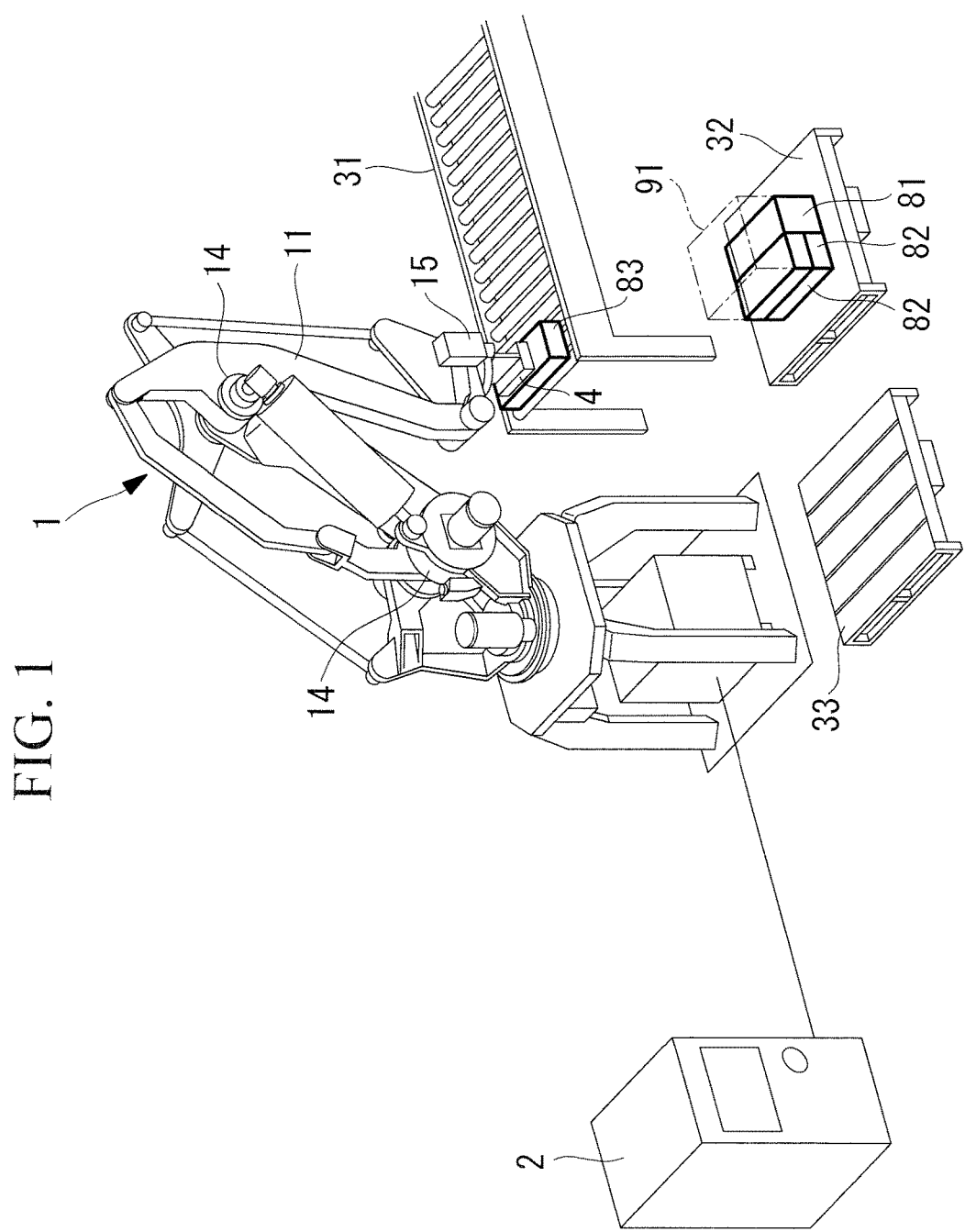
FIG. 1 is a diagram showing, in outline, the configuration of a stacking system according to an embodiment of the present invention.

A stacking-pattern calculating device and a stacking system according to an embodiment of the present invention will be described in detail below with reference to the drawings. Note that, as shown in FIGS. 3A to 3C, for the sake of simplicity, this embodiment will be described in terms of an example in which two of each of three types of boxes 81, 82, and 83 referred to as boxes A, B, and C are provided, and in which these boxes A, B, and C are stacked inside an accommodating region 91 shown in FIG. 3D.

As shown in FIG. 3A, the box 81 has a cuboid shape in which the width is 50 cm, the length is 90 cm, and the height is 50 cm, and is referred to as the box A having a weight of 20 kg and a load limit of 100 kg/m$^2$. As shown in FIG. 3B, the box 82 has a cuboid shape in which the width is 50 cm, the length is 90 cm, and the height is 25 cm, and is referred to as the box B having a weight of 10 kg and a load limit of 30 kg/m$^2$. As shown in FIG. 3C, the box 83 has a cuboid shape in which the width is 50 cm, the length is 90 cm, and the height is 25 cm, and is referred to as the box C having a weight of 20 kg and a load limit of 100 kg/m$^2$.

As shown in FIG. 3D, the accommodating region 91 has a cuboid shape in which the width is 100 cm, the length is 90 cm, and the height is 100 cm. As the coordinate system of the accommodating region 91, a coordinate system in which one of the four corners of the bottom surface of the accommodating region 91 serves as the origin is set. In this embodiment, an apex of the bottom surface at the back side in the plane of the figure is set to be the origin, the x-axis is taken in the length direction, the y-axis is taken in the width direction, and the z-axis is taken in the height direction.

As shown in FIG. 1, the stacking system of this embodiment is provided with: a conveyor (transferring device) 31 that transfers, one by one, the boxes A, B, and C that are referred to as the boxes 81, 82, and 83; a robot 1 that places the transferred boxes A, B, and C in the accommodating region 91 on a palette 32; a camera (detecting device) 15 that is attached to a hand tip portion of the robot 1 and that detects the types of the boxes A, B, and C; a weight measuring means (detecting device) such as a weight sensor or the like (not shown) that is provided in the robot 1 or the conveyor 31; and a control device 2 that controls the operation of the robot 1 on the basis of outputs from the camera 15 and the weight sensor or the like.

The robot 1 is a multi-joint robot having a mechanism in which a plurality of linkages 11 are joined via joints 14, and a hand 4 that grips the boxes A, B, and C is attached to a distal-end portion thereof.

The control device 2 is configured so as to create, in advance, stacking patterns for accommodating the boxes A, B, and C in the accommodating region 91, and so as to control the operation of the robot 1 in accordance with the created stacking patterns.

The operation of the stacking system having the above-described configuration will be described.

The boxes A, B, and C that are transferred, one by one, by the conveyor 31 in an irregular order are measured by the camera 15 and the weight sensor (not shown) or the like, and the control device 2 identifies the box types that match with one of the boxes A, B, and C on the basis of the measurement results. Then, on the basis of the identified box types, an optimal stacking pattern is selected from among the stacking patterns that are calculated in advance and stored in the control device 2. Then, the control device 2 controls the robot 1 so as to complete the selected stacking pattern, thus stacking the boxes A, B, and C in the accommodating region 91 on the palette 32.

Note that, depending on the order in which the boxes are transferred, there are cases in which it is not possible to immediately stack the boxes in the accommodating region 91 in accordance with the stacking pattern. A temporary table 33 is provided so as to server as a temporary placement space for such cases.

The configuration of the control device 2 provided in the stacking system will be described in detail below with reference to the drawings.

The control device 2 is provided with: a processor; main storage devices such as a ROM (Read Only Memory), a RAM (Random Access Memory), and so forth; an auxiliary storage device such as an HDD (Hard Disk Drive) or the like; an input device such as a keyboard or the like; an output device such as a monitor or the like; and an external interface or the like (all of which are not shown) that performs transfer of various data to and from external equipment that are connected with each other via a bus, and is configured so that the processor realizes individual functions.

Figure 2:
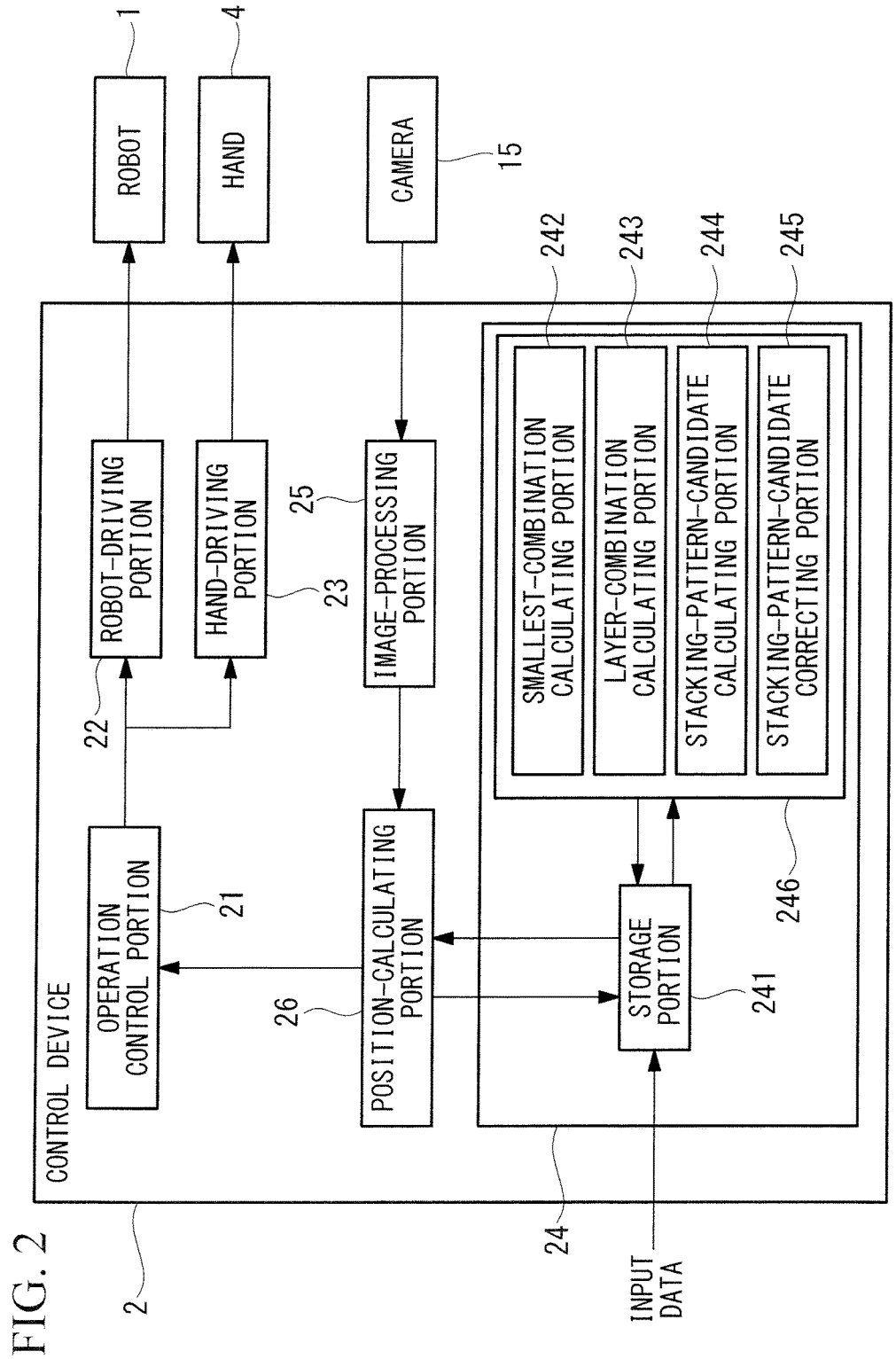
FIG. 2 is a block diagram of a control device provided in the stacking system in FIG. 1.

As shown in FIG. 2, the control device 2 is provided with, as functional blocks: an operation control portion 21; a robot-driving portion 22; a hand-driving portion 23; a stacking-pattern calculating portion (stacking-pattern calculating device) 24; an image-processing portion 25; and a position-calculating portion 26.

The image-processing portion 25 is connected to the camera 15 via the external interface, and measures the sizes of the boxes A, B, and C transferred by the conveyor 31 by analyzing the images captured by the camera 15. The image-processing portion 25 outputs the measurement results to the position-calculating portion 26.

As shown in FIG. 2, the position-calculating portion 26 is connected to the image-processing portion 25, the weight measuring means (not shown), the stacking-pattern calculating portion 24, and the operation control portion 21. The position-calculating portion 26 distinguishes the types of the boxes A, B, and C on the basis of the dimensions of the boxes A, B, and C measured by the image-processing portion 25 and the weights of the boxes A, B, and C measured by the weight measuring means, and calculates the positions at which the boxes A, B, and C will be placed in the accommodating region 91 on the basis of the stacking pattern generated by the stacking-pattern calculating portion 24.

The operation control portion 21 is connected to the robot-driving portion 22, the hand-driving portion 23, and the position-calculating portion 26, and transmits operating instructions to the robot-driving portion 22 and the hand-driving portion 23 on the basis of the positions calculated by the position-calculating portion 26.

The robot-driving portion 22 is connected to the robot 1 via the external interface. The robot-driving portion 22 is provided with electric circuits for driving the joints 14 of the robot 1 on the basis of the operating instructions received from the operation control portion 21.

The hand-driving portion 23 is connected to the hand 4 via the external interface. The hand-driving portion 23 is provided with an electrical circuit for driving the hand 4 on the basis of the operating instructions received from the operation control portion 21.

The stacking-pattern calculating portion 24 calculates the arrangement patterns of the boxes A, B, and C to be placed inside the accommodating region 91. The configuration of the stacking-pattern calculating portion 24 will be described in detail below with reference to the drawings.

As shown in FIG. 2, the stacking-pattern calculating portion 24 is provided with a storage portion 241 and a stacking-pattern generating portion 246.

The storage portion 241 is connected to the position-calculating portion 26 and the stacking-pattern generating portion 246. The storage portion 241 receives and stores input data input via the input device provided in the control device 2, and also stores the stacking patterns generated by the stacking-pattern generating portion 246. Note that, in this embodiment, although the stacking-pattern calculating portion 24 is provided with the storage portion 241 as a special storing means, it is not limited thereto, and it is possible to use a portion of the main storage device (not shown) or the auxiliary storage device (not shown) provided in the control device 2 as the storage portion 241.

The input data include the types of the boxes A, B, and C to be stacked, the dimensions, the weights, the load limits, and the numbers of the respective boxes, and the dimensions of the accommodating region 91.

As shown in FIG. 2, the stacking-pattern generating portion 246 is provided with, as functional blocks: a smallest-combination calculating portion 242; a layer-combination calculating portion 243; a stacking-pattern-candidate calculating portion 244; and a stacking-pattern-candidate correcting portion 245, generates stacking patterns, and stores the generated stacking patterns in the storage portion 241.

The smallest-combination calculating portion 242 calculates, by combining one or more of the boxes A, B, and C, combinations that serve as smallest units that have a constant height and the smallest bottom area.

In this embodiment, as shown in FIGS. 3A to 3C, all of the boxes A, B, and C have the same bottom area, and the bottom area becomes the smallest in combinations in which the boxes A, B, and C are stacked in the height direction. In addition, in this case, the height thereof becomes constant. Therefore, the combinations in which the boxes A, B, and C are stacked in the height direction serve as the smallest units.

In addition, in this case, the weights exerted per unit area of the individual boxes to be stacked are calculated, and combinations are calculated such that the calculated weights per unit area exerted on the boxes do not exceed the load limits per unit area of the boxes. Specifically, because the weights per unit area of the boxes A, B, and C are 44.4 kg/m$^2$, 22.2 kg/m$^2$, and 44.4 kg/m$^2$, respectively, combinations in which the box A or C is placed on the box B, which has a load limit of 30 kg/m$^2$, are excluded.

Furthermore, combinations are calculated so that boxes having heavier weights per unit area are placed at lower positions. In the case of this embodiment, combinations are calculated so that the boxes A and C are placed at lower positions than the box B is. Note that, because the boxes A and C have the same weight per unit area, a combination in which the box C is placed on the box A or a combination in which the box A is placed on the box C may be employed.

FIGS. 4A to 4C show combinations of the boxes A, B, and C that form the thus-calculated smallest units.

Note that, in this embodiment, because the numbers of the boxes A, B, and C are two each, the upper limit of the number of the boxes A, B, and C that can be stacked to form the smallest unit is two each. In addition, the size of the smallest unit naturally needs to be a size that can be placed inside the accommodating region 91.

The layer-combination calculating portion 243 calculates combinations of the boxes A, B, and C that form layers that have a rectangular shape in a plan view by placing the smallest units having the same heights among the smallest units calculated by the smallest-combination calculating portion 242 next to each other in an XY-direction (horizontal direction) in the accommodating region 91. In addition, the layer-combination calculating portion 243 calculates combinations in which the smallest units having a high weight per unit area are placed close to the origin in the accommodating region 91.

FIGS. 5A and 5B show combinations of the boxes A, B, and C calculated by the layer-combination-calculating portion 243. FIG. 5A shows combinations of the smallest units having a height of 25 cm shown in FIG. 4A. Regarding the smallest unit formed of the box B and the smallest unit formed of the box C, because the weight per unit area of the smallest unit formed of the box C is greater than the weight per unit area of the smallest unit formed of the box B, the smallest unit formed of the box C is placed so as to be close to the origin in the accommodating region 91. FIG. 5B shows combinations of the smallest units having a height of 75 cm shown in FIG. 4C. Regarding the smallest unit formed of the boxes A and C and the smallest unit formed of the boxes A and B, because the weight per unit area of the smallest unit formed of the boxes A and C is greater than the weight per unit area of the smallest unit formed of the boxes A and B, the smallest unit formed of the boxes A and C is placed so as to be close to the origin in the accommodating region 91. Note that, in this embodiment, because the numbers of the boxes A, B, and C are two each, the upper limit of the number of the boxes A, B, and C that can be stacked to form the layer is two each. In addition, the size of the layer naturally needs to be a size that can be placed inside the accommodating region 91.

In addition, combinations of the smallest units having a height of 50 cm shown in FIG. 4B and combinations of the smallest units having a height of 100 cm shown in FIG. 4D also exist as combinations of the smallest units, and, although calculations are also performed for these combinations, the descriptions thereof will be omitted herein.

The stacking-pattern-candidate calculating portion 244 calculates stacking-pattern candidates in which all of the boxes A, B, and C are placed inside the accommodating region 91 by placing the layers having a rectangular shape in a plan view calculated by the layer-combination calculating portion 243 on top of each other in a Z-direction (vertical direction) in the accommodating region 91. FIG. 6 shows examples of the stacking-pattern candidates in the case in which a layer having a height of 75 cm shown in FIG. 5B is placed on a layer having a height of 25 cm shown in FIG. 5A.

Note that, in this embodiment, because the numbers of the boxes A, B, and C are two each, the upper limit of the number of the boxes A, B, and C that can be stacked to form the stacking-pattern candidate is two each. In addition, the size of the stacking-pattern candidate naturally needs to be a size that can be placed inside the accommodating region 91.

Figure 7:
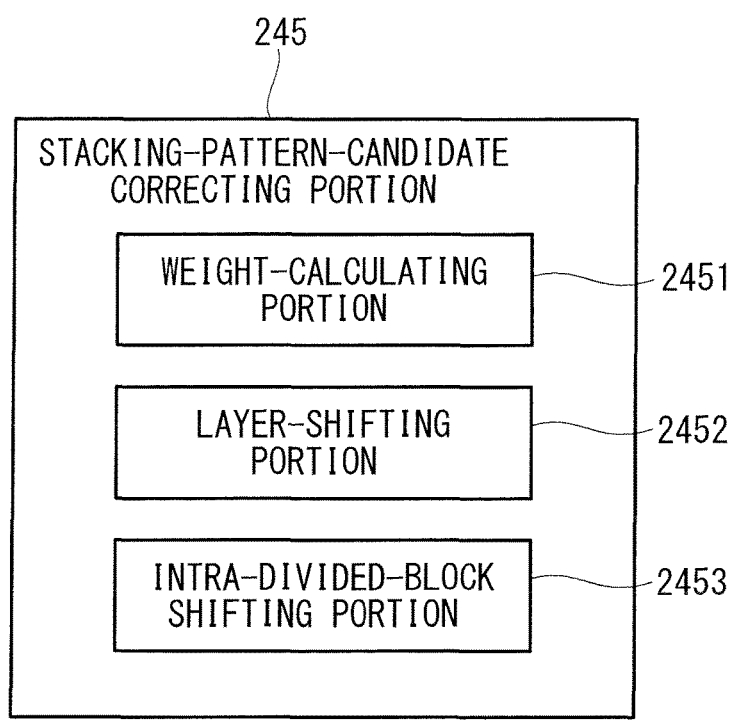
FIG. 7 is a block diagram of a stacking-pattern-candidate correcting portion shown in FIG. 2.

The stacking-pattern-candidate correcting portion 245 calculates the weights exerted on the individual boxes forming the stacking-pattern candidate calculated by the stacking-pattern-candidate calculating portion 244, and corrects the stacking-pattern candidates by shifting the boxes so that weights exceeding the load limits thereof are not exerted on the individual boxes. Specifically, as shown in FIG. 7, the stacking-pattern-candidate correcting portion 245 is provided with a weight-calculating portion 2451, a layer-shifting portion 2452, and an intra-divided-block shifting portion 2453.

The weight-calculating portion 2451 calculates the weights per unit area exerted on the individual boxes forming the stacking-pattern candidates.

Figure 8:
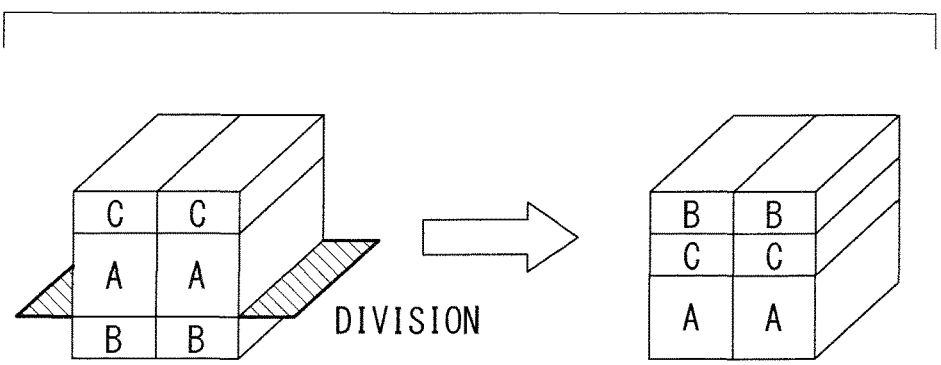
FIG. 8 is a diagram for explaining processing performed in a layer-shifting portion shown in FIG. 7.

In the case in which the weight per unit area exerted on one of the boxes A, B, and C forming a stacking-pattern candidate exceeds the load limit of that box, the layer-shifting portion 2452 shifts the entire layer including the subject box in the Z-direction (vertical direction). For example, in the example shown in FIG. 8, because a weight per unit area that exceeds the load limit of the box B is exerted thereon, the stacking-pattern candidate is corrected by shifting the bottom most layer including the box B in the Z-direction so that the layer becomes the uppermost layer.

Note that the layer may not necessarily be the layer calculated by the layer-combination calculating portion 243. All of individual blocks generated by dividing the stacking-pattern candidate in the XY-direction (horizontal direction) at an arbitrary position are considered to be layers. In other words, in FIG. 8, in the case in which a division in the XY-direction is made between the boxes A and C, the block formed of the boxes C, as well as the block formed of the boxes A and B, are considered to be layers.

Figure 9:
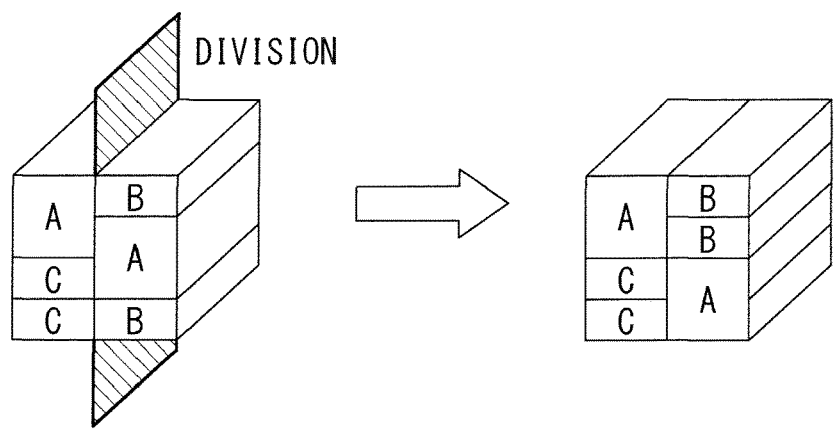
FIG. 9 is a diagram for explaining processing performed in an intra-divided-block shifting portion shown in FIG. 7.

In the case in which the weight per unit area exerted on one of the boxes A, B, and C forming a stacking-pattern candidate exceeds the load limit of that box, as shown in FIG. 9, the intra-divided-block shifting portion 2453 divides the stacking-pattern candidate into two blocks in the Z-direction (vertical direction), and shifts the position of the box in the block including that box. For example, in the example shown in FIG. 9, because a weight per unit area that exceeds the load limit of the box B, which is positioned at the lowest position in the divided block on the right side, is exerted thereon, the stacking-pattern candidate is corrected by shifting the position of the box B in the right block in the Z-direction so that the box B is positioned at an upper position.

Next, processing performed in the stacking-pattern calculating portion 24 having the above-described configuration will be described with reference to FIGS. 2, 7, 10 and 11.

Figure 10:
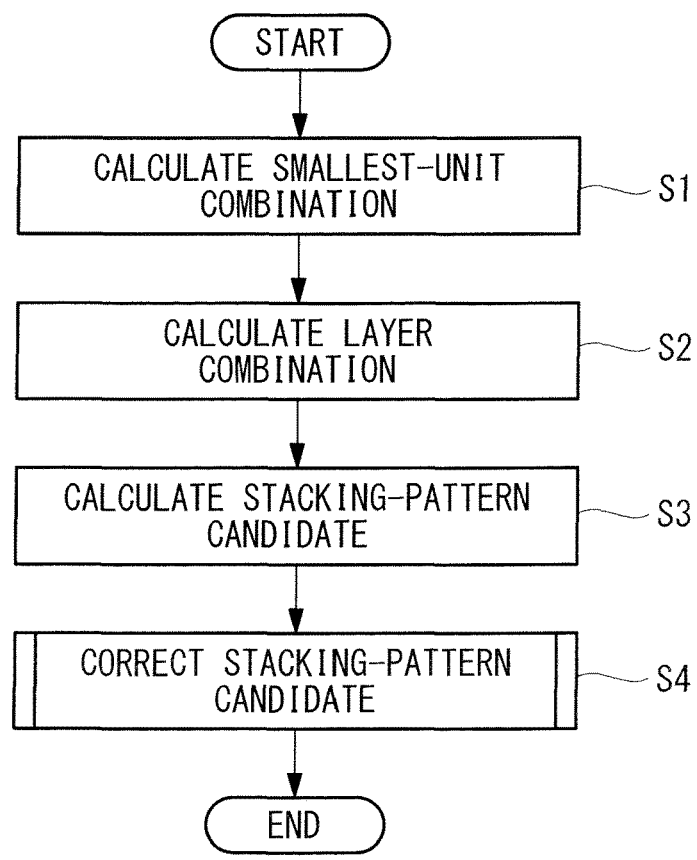
FIG. 10 is a flowchart showing processing performed in a stacking-pattern calculating portion according to the embodiment of the present invention.

First, as shown in FIGS. 2 and 10, the smallest-combination calculating portion 242 reads out the input data stored in the storage portion 241, and, on the basis of the dimensions, the weights, the load limits, and the numbers of the boxes A, B, and C and the dimensions of the accommodating region 91 included in the input data, calculates the combinations of the boxes A, B, and C that form the smallest units (step S1 in FIG. 10). Next, on the basis of the weights and the numbers of the boxes A, B, and C and the dimensions of the accommodating region 91 included in the input data, the layer-combination calculating portion 243 calculates the combinations of the boxes A, B, and C that form the layers in which the smallest units calculated by the smallest-combination calculating portion 242 are placed next to each other in the horizontal direction so as to have a rectangular shape in a plan view (step S2 in FIG. 10). Next, on the basis of the numbers of the boxes A, B, and C and the dimensions of the accommodating region 91 included in the input data, the stacking-pattern-candidate calculating portion 244 calculates the combinations of the layers that form the stacking-pattern candidates in which the layers calculated by the layer-combination calculating portion 243 are placed on top of each other in the vertical direction (step S3 in FIG. 10). Finally, on the basis of the weights and the load limits of the boxes A, B, and C included in the input data, the stacking-pattern-candidate correcting portion 245 corrects the stacking-pattern candidates calculated by the stacking-pattern-candidate calculating portion 244 (step S4 in FIG. 10).

Figure 11:
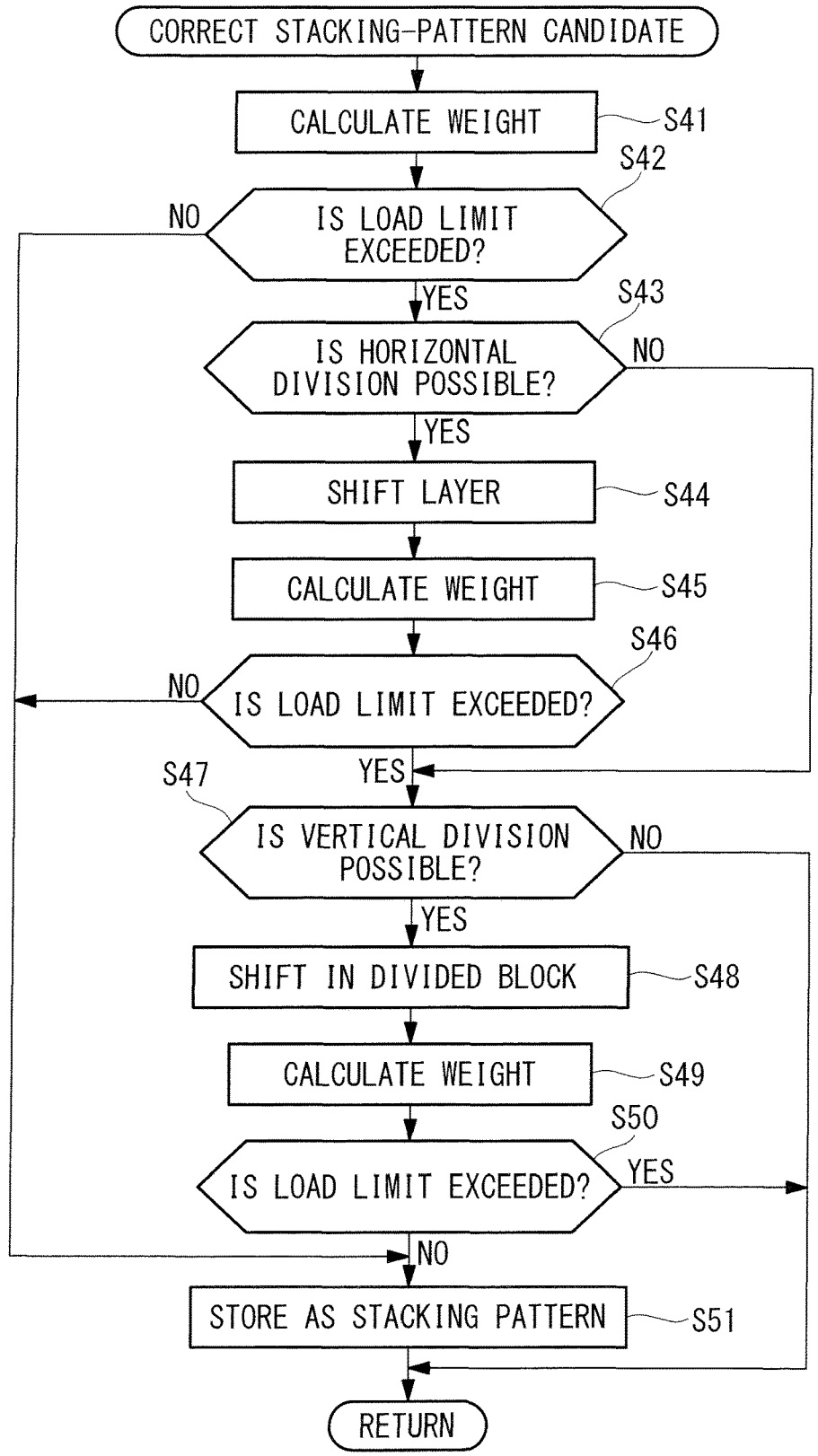
FIG. 11 is a flow chart showing processing performed in a stacking-pattern-candidate correcting step shown in FIG. 10.

Processing performed in the stacking-pattern-candidate correcting portion 245 will be described in more detail below with reference to FIGS. 7 and 11. Note that FIG. 11 is a flowchart showing processing that is executed for one stacking-pattern candidate calculated by the stacking-pattern-candidate calculating portion 244. Therefore, in the case in which there are a plurality of stacking-pattern candidates, the processing shown in FIG. 11 is executed for each one of the plurality of stacking-pattern candidates.

First, the weight-calculating portion 2451 calculates the weights per unit area exerted on the individual boxes forming the stacking-pattern candidate calculated by the stacking-pattern-candidate calculating portion 244 (step S41 in FIG. 11).

Next, it is judged whether or not the weights per unit area exerted on the individual boxes exceed the load limits of the individual boxes (step S42 in FIG. 11). In the case in which the weights per unit area exerted on the individual boxes do not exceed the load limits of the individual boxes, the stacking-pattern candidate is stored in the storage portion 241 as the stacking pattern (step S51 in FIG. 11), and processing is ended.

In the case in which the weights per unit area exerted on one of the boxes A, B, and C exceed the load limits of the boxes, it is judged whether or not it is possible to generate two blocks that serve as layers by dividing the stacking-pattern candidate in the horizontal direction (step S43 in FIG. 11).

In the case in which it is possible to divide the stacking-pattern candidate in the horizontal direction, the layer-shifting portion 2452 shifts the entire layer that includes the box on which the weight per unit area that exceeds the load limit thereof is exerted (step S44 in FIG. 11). Then, in the state in which the layer has been shifted, the weight calculation is performed again (step S45 in FIG. 11), and it is judged whether or not the weights per unit area exerted on the individual boxes exceed the load limits of the individual boxes (step S46 in FIG. 11). Here, in the case in which the weights per unit area exerted on the individual boxes do not exceed the load limits of the individual boxes, the stacking-pattern candidate is stored in the storage portion 241 as the stacking pattern (step S51 in FIG. 11), and processing is ended.

In the case in which the weights per unit area exerted on one of the boxes A, B, and C exceed the load limits of the boxes in step S46 or in the case in which it is not possible to divide the stacking-pattern candidate in the horizontal direction in step S43, it is judged whether or not it is possible to generate two divided blocks by dividing the stacking-pattern candidate in the vertical direction (step S47 in FIG. 11).

In the case in which it is possible to divide the stacking-pattern candidate in the vertical direction, the intra-divided-block shifting portion 2453 shifts the box in the divided block including that box on which the weight per unit area that exceeds the load limit thereof is exerted (step S48 in FIG. 11). Then, in the state in which the box has been shifted, the weight calculation is performed again (step S49 in FIG. 11), and it is judged whether or not the weights per unit area exerted on the individual boxes exceed the load limits of the individual boxes (step S50 in FIG. 11). Here, in the case in which the weights per unit area exerted on the boxes A, B, and C do not exceed the load limits of the individual boxes, the stacking-pattern candidate is stored in the storage portion 241 as the stacking pattern (step S51 in FIG. 11), and processing is ended.

In the case in which the weights per unit area exerted on one of the boxes A, B, and C exceed the load limits of the boxes in step S50 or in the case in which it is not possible to divide the stacking-pattern candidate in the vertical direction in step S47, processing is ended.

Note that, when storing the stacking patterns in the storage portion 241, it is checked whether or not identical stacking patterns are stored in the storage portion 241, and, in the case in which identical stacking patterns are already stored in the storage portion 241, such stacking patterns are not stored in order to avoid redundancy.

As has been described above, with the stacking-pattern calculating portion 24 and the stacking system of the above-described embodiment, because the stacking patterns are calculated by using not only the dimensions and the numbers of the boxes A, B, and C but also the weights and the load limits of the boxes A, B, and C, it is possible, when stacking the boxes A, B, and C, to reliably stack the boxes without causing the boxes to collapse.

As has been described above, although the embodiment of the present invention has been described in detail with reference to the drawings, specific configurations are not limited to this embodiment, and design alterations or the like that do not depart from the scope of the present invention are also encompassed.

For example, in the above-described embodiment, although, for the sake of simplicity, the three types of boxes, 81, 82, and 83 referred to as the boxes A, B, and C have been described assuming that two of each are provided, there is no limitation thereto. There may be more than three types of boxes or there may be two or fewer types of boxes. In addition, the dimensions, the weights, the load limits, and the numbers of the individual boxes are also not limited to the values described above.

In addition, in the above-described embodiment, although the accommodating region 91 is assumed to have a cuboid shape in which the width is 100 cm, the length is 90 cm, and the height is 100 cm, there is no limitation thereto, and it is possible to employ an arbitrary shape.

In addition, in the above-described embodiment, although the camera 15 is assumed to be attached to the hand tip portion of the robot 1, it may be installed at, for example, a portion above the conveyor 31.

As a result, the above-described embodiment leads to the following aspects.

A first aspect of the present invention is a stacking-pattern calculating device that calculates a stacking pattern when accommodating multiple types of boxes in an accommodating region, the stacking-pattern calculating device comprising: a storage portion that stores dimensions, weights, load limits, and numbers of the respective types of the boxes and dimensions of the accommodating region; a smallest-combination calculating portion that calculates, on the basis of the dimensions, the weights, the load limits, and the numbers of the respective types of the boxes and the dimensions of the accommodating region, combinations of the boxes that form smallest units that are formed of one or more boxes, that have a constant height, and in which a bottom area becomes the smallest; a layer-combination calculating portion that calculates, on the basis of the weights and the numbers of the respective types of the boxes and the dimensions of the accommodating region, combinations of the boxes that form layers in which the smallest units having the same height among the combinations of the smallest units are placed next to each other in a horizontal direction so as to have a rectangular shape in a plan view; a stacking-pattern-candidate calculating portion that calculates, on the basis of the numbers of the respective types of the boxes and the dimensions of the accommodating region, a stacking-pattern candidate by placing the layers on top of each other in a vertical direction in the combination of the layers; and a stacking-pattern-candidate correcting portion that corrects the stacking-pattern candidate on the basis of the weights and the load limits of the respective types of the boxes.

With the stacking-pattern calculating device according to this aspect, the smallest-combination calculating portion calculates, on the basis of the dimensions, the weights, the load limits, and the numbers of the respective types of the boxes and the dimensions of the accommodating region stored in the storage portion, the combinations that form the smallest units that are formed of one or more boxes, that have a constant height, and in which the bottom area becomes the smallest. The layer-combination calculating portion calculates, on the basis of the weights and the numbers of the respective types of the boxes and the dimensions of the accommodating region stored in the storage portion, the combinations that form the layers in which the smallest units having the same height among the combinations of the smallest units are placed next to each other in a horizontal direction so as to have a rectangular shape in a plan view. The stacking-pattern-candidate calculating portion calculates, on the basis of the numbers of the respective types of the boxes and the dimensions of the accommodating region stored in the storage portion, the stacking-pattern candidate in which the layers are placed on top of each other in the vertical direction. Then, the stacking-pattern-candidate correcting portion corrects the stacking-pattern candidate on the basis of the weights and load limits of the respective types of the boxes stored in the storage portion. In this way, a stacking pattern is generated.

As above, because the stacking pattern is calculated in consideration of not only the dimensions and the numbers of the boxes, but also the weights and the load limits of the boxes, it is possible to generate a highly reliable stacking pattern that does not cause the boxes to collapse when stacking the boxes.

In the stacking-pattern calculating device according to the above-described aspect, the stacking-pattern-candidate correcting portion may be provided with: a weight-calculating portion that calculates weights per unit area exerted on the individual boxes in the stacking-pattern candidate; a layer-shifting portion that shifts the layer in the vertical direction so that the calculated weights per unit area become equal to or less than the load limits of the individual boxes; and an intra-divided-block shifting portion that shifts the box in the vertical direction so that the calculated weights per unit area become equal to or less than the load limits of the individual boxes in a divided block created by dividing the stacking-pattern candidate in the vertical direction.

By doing so, it is possible to reliably make the weights per unit area exerted to the individual boxes equal to or less than the load limits of the individual boxes. As a result, it is possible to generate a highly reliable stacking pattern that does not cause the boxes to collapse when stacking the boxes.

A second aspect of the present invention is a stacking system comprising a control device that is provided with a stacking-pattern calculating device described above, and that calculates, on the basis of the calculated stacking pattern, positions of the boxes inside the accommodating region; a transferring device that transfers the multiple types of boxes; a robot that places the transferred boxes inside the accommodating region; and a detecting device that detects the types of the boxes.

The present invention affords an advantage in that it is possible to create a stacking pattern that allows boxes to reliably be stacked without causing the boxes to collapse.

REFERENCE SIGNS LIST 1 robot
2 control device
15 camera (detecting device)
24 stacking-pattern calculating portion (stacking-pattern calculating device)
31 conveyor (transferring device)
81, 82, 83 box
91 accommodating region
241 storage portion
242 smallest-combination calculating portion
243 layer-combination calculating portion
244 stacking-pattern-candidate calculating portion
245 stacking-pattern-candidate correcting portion
2451 weight-calculating portion
2452 layer-shifting portion
2453 intra-divided-block shifting portion

The invention claimed is:

1. A stacking-pattern calculating device that calculates a stacking pattern when accommodating multiple types of boxes in an accommodating region, the stacking-pattern calculating device comprising:
a storage portion that stores dimensions, weights, load limits, and numbers of the respective types of the boxes and dimensions of the accommodating region;
a smallest-combination calculating portion that calculates, by a processor, on the basis of the dimensions, the weights, the load limits, and the numbers of the respective types of the boxes and the dimensions of the accommodating region, combinations of the boxes that form smallest units that are formed of one or more boxes, that have a constant height, and in which a bottom area becomes the smallest;
a layer-combination calculating portion that calculates, by the processor, on the basis of the weights and the numbers of the respective types of the boxes and the dimensions of the accommodating region, combinations of the boxes that form layers in which the smallest units having the same height among the combinations of the smallest units are placed next to each other in a horizontal direction so as to have a rectangular shape in a plan view;
a stacking-pattern-candidate calculating portion that calculates, by the processor, on the basis of the numbers of the respective types of the boxes and the dimensions of the accommodating region, a stacking-pattern candidate by placing the layers on top of each other in a vertical direction in the combination of the layers; and
a stacking-pattern-candidate correcting portion that corrects, by the processor, the stacking-pattern candidate on the basis of the weights and the load limits of the respective types of the boxes.

2. A stacking-pattern calculating device according to claim 1, wherein the stacking-pattern-candidate correcting portion is provided with a weight-calculating portion that calculates weights per unit area exerted on the individual boxes in the stacking-pattern candidate;
a layer-shifting portion that shifts the layer in the vertical direction so that the calculated weights per unit area become equal to or less than the load limits of the individual boxes; and
an intra-divided-block shifting portion that shifts the box in the vertical direction so that the calculated weights per unit area become equal to or less than the load limits of the individual boxes in a divided block created by dividing the stacking-pattern candidate in the vertical direction.

3. A stacking-pattern calculating device according to claim 1, wherein the layer-combination calculating portion calculates combinations in which the smallest units having a high weight per unit area are placed close to an origin in the accommodating region.

4. A stacking-pattern calculating device according to claim 1, wherein, in a case in which the smallest units are formed of two or more boxes, the smallest-combination calculating portion calculates the weights exerted per unit area of the individual boxes to be stacked, and calculates combinations such that the calculated weights per unit area exerted on the boxes do not exceed the load limits per unit area of the boxes.

5. A stacking-pattern calculating device according to claim 4, wherein the smallest-combination calculating portion calculates the combinations so that boxes having heavier weights per unit area are placed at lower positions.

6. A stacking system comprising:
a control device that is provided with a stacking-pattern calculating device according to claim 1, and that calculates, by the processor, on the basis of the calculated stacking pattern, positions of the boxes inside the accommodating region;
a transferring device that transfers the multiple types of boxes;
a robot that places the transferred boxes inside the accommodating region; and
a detecting device that detects the types of the boxes.

* * * * *